United States Patent [19]

Schenk

[11] 3,999,810
[45] Dec. 28, 1976

[54] HYDRAULIC BRAKE PRESSURE MODULATOR

[75] Inventor: Donald E. Schenk, Dayton, Ohio

[73] Assignee: General Motors Corporation, Detroit, Mich.

[22] Filed: Apr. 29, 1976

[21] Appl. No.: 681,335

[52] U.S. Cl. .................................. 303/115; 303/63
[51] Int. Cl.² ...................... B60T 8/26; B60T 8/06
[58] Field of Search ............ 303/6 C, 63, 113, 115, 303/116, 119; 188/181 A

[56] References Cited
UNITED STATES PATENTS

| | | | |
|---|---|---|---|
| 3,810,680 | 5/1974 | Schenk | 303/6 C |
| 3,871,717 | 3/1975 | Jensen | 303/115 |

Primary Examiner—Duane A. Reger
Attorney, Agent, or Firm—D. D. McGraw

[57] ABSTRACT

A hydraulic modulator which is positioned in a hydraulic brake pressure circuit forming a part of a brake system. The modulator uses power steering pump output fluid under normal conditions. When actuated, the relatively free flowing, low pressure fluid is restricted to build up pressure, causing the modulator to seal the modulating chamber from the supply pressure portion of the rear brake system and then open the rear brake apply conduit to a displacement-increasing modulating chamber. The rate of displacement increase is controlled by a release restriction through which trapped pressurized fluid from the power steering pump is controllably released to the pump reservoir. Upon deactivation of the modulator, the displacement is decreased and rear brake pressure is reapplied. When no pressure is available from the power steering pump, the modulator piston and displacement valve are so positioned as to seal the modulating chamber from the remainder of the brake system and connect the master cylinder port to the rear brake port.

2 Claims, 2 Drwaing Figures

HYDRAULIC BRAKE PRESSURE MODULATOR

The modulator embodying the invention is illustrated as being used in a hydraulic brake system having a master cylinder actuated by any type of booster or directly by the brake pedal and push rod, first and second brake pressure hydraulic circuits connecting the master cylinder to first and second sets of brakes, and a wheel lock control sensor and logic mechanism generating a wheel lock control signal. The modulator is positioned in one of the brake pressure circuits to modify the braking action of the set of brakes connected thereto in accordance with the wheel lock control signal. The power steering pump is forced by the modulator to develop modulator pressure only when the wheel lock control function is required.

IN THE DRAWING

Figure 1:
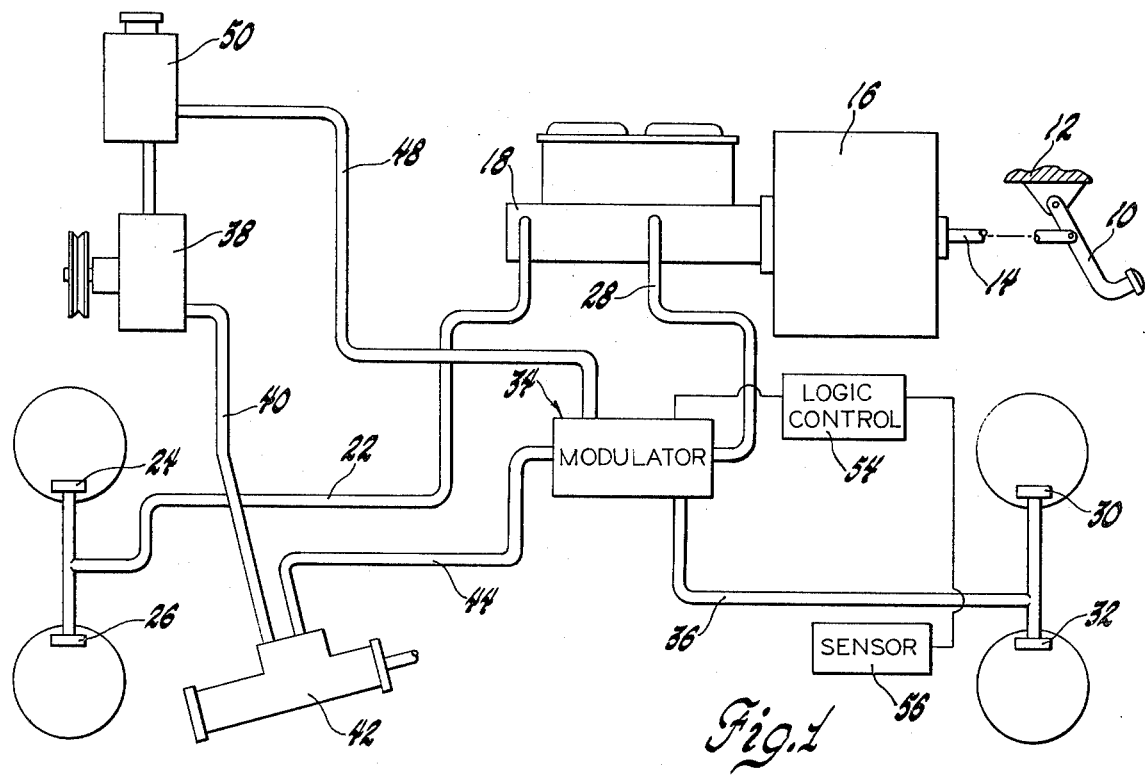
FIG. 1 is a schematic diagram showing a brake system including a modulator embodying the invention.

The brake system shown in FIG. 1 includes a brake pedal 10 suitably mounted on a portion 12 of a vehicle so as to be operated by the vehicle operator to actuate the vehicle brakes. The pedal is illustrated as being connected through push rod 14 to a suitable brake booster 16 which is connected to the master cylinder assembly 18 for master cylinder operation. In manual brake systems, push rod 14 will directly actuate the master cylinder assembly. A conduit 22 connects the master cylinder with the front set of brakes 24 and 26, and conduit 28 connects the master cylinder with the rear set of brakes 30 and 32 through the modulator 34 and conduit 36.

The system also includes the power steering system of the vehicle. The power steering pump 38 is suitably driven by the vehicle engine and is connected by conduit 40 to the power steering gear 42, which is of the open center type. The outlet of power steering gear 42 is connected by conduit 44 to supply boost pressure to the modulator 34. Conduit 48 connects the outlet of the modulator to the power steering pump reservoir 50. As is schematically illustrated, the modulator is connected with a wheel lock control mechanism including the logic control 54 and the sensor 56. As is well-known in the wheel lock control art, sensor 56 may sense incipient wheel lock of the rear wheels, for example, and send appropriate signals to the logic control 54 to generate a wheel lock control signal for the modulator 34. The signal actuates the modulator to cause a decrease of brake apply pressure at the rear wheel brakes, permitting the rear wheels to roll within a desirable range of percent wheel slip instead of locking.

The modulator 34 has a housing 58 illustrated as being made of several sections for ease of manufacture and assembly. The support section 60 has the displacement section 62 suitably secured to one end. A bore 64 extends through both of these housing sections, as will be described in further detail. A solenoid case 66 is secured to one side of the support section 60 and provides a container for the control solenoid 68 and associated linkage. The interior of case 66 also defines a chamber 70, with the outlet 72 connected to conduit 48 so that chamber 70 is always in direct fluid communication with the sump or reservoir 50.

Bore 64 is a stepped bore defining three axially aligned cylinders. The first cylinder 74 is the smallest in diameter of the three cylinders. One cylinder end 76 of cylinder 74 has a actuating pressure inlet 78 opening into it. This inlet is connected with conduit 44 to receive fluid from the power steering pump 38 through conduit 40, and power steering gear 42. The other end of cylinder 74 opens through bore shoulder 80 into one end of the second cylinder 82, which is the largest in diameter of the three cylinders. The other end of cylinder 82 is defined by bore shoulder 84, and the third cylinder 86 opens into the second cylinder 82 through shoulder 84. The third cylinder end 88 has a passage 90 extending therethrough and connecting with a valve chamber 92. Passage 90 is considered to be an outlet from chamber 92, although during the course of modulator operation flow is reversed through the passage and it acts as an inlet for that chamber. For clarity of description, however, it will be referred to as a valve chamber outlet. An inlet port 94 is connected with conduit 28 to conduct master cylinder pressurizing fluid, destined for the rear brakes 30 and 32, to the modulator 34. A passage 96 is connected with brake apply pressure conduit 36 to conduct brake fluid between the modulator and the rear brakes 30 and 32. The annular edges formed in the walls of valve chamber 92 by the aligned passage 90 and inlet port 94 are respectively formed to define valve seats 98 and 100. The displacement valve 102 is received in chamber 92 and is illustrated as being a ball type valve. A light valve spring 104 continually urges the valve toward engagement with valve seat 98 so that outlet 90 is normally closed by the valve, while inlet 94 is in fluid communication with passage 96 through the valve chamber 92.

The housing support section 60 has a valve chamber 106 formed therein with an inlet 108 connecting the actuating pressure inlet 78 with the valve chamber. The annular end of inlet 108 formed by a valve chamber wall defines a valve seat 110. An outlet passage 112 is positioned on the other side of valve chamber 106 from inlet 108 and is aligned therewith to define another valve seat 114. Outlet 112 opens into chamber 70 and therefore is in fluid communication with the pump reservoir 50. A passage 116 extending between valve chamber 106 and cylinder 82 provides continuous fluid communication between that portion of cylinder 82 adjacent shoulder 80, through which passage 116 opens, and the valve chamber 106. Passage 116 is a suitably sized orifice to provide controlled release of the rear brakes, as will be described. A modulator control valve 118 is contained in valve chamber 106 and has a light valve spring 120 urging the valve against valve seat 114 to normally close outlet 112. When the valve 118 is in this position, inlet 108 is connected to one end of cylinder 82 through the valve chamber 106 and the passage 116.

Figure 2:
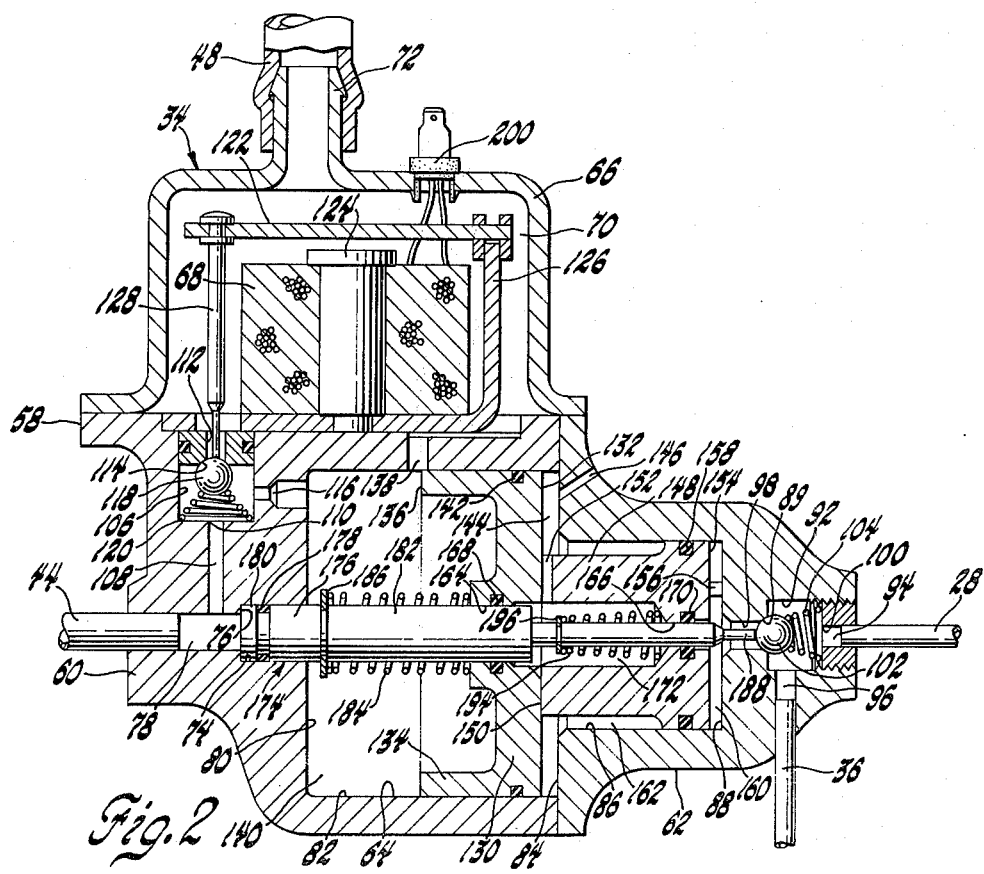
FIG. 2 is a cross-section view of the modulator embodying the invention.

The solenoid 68 in chamber 70 has an armature 122 pivotally mounted over the solenoid core 124, the pivotal attachment to the armature support 126 being at one armature end. The other armature end has a valve actuator stem 128 attached thereto and extending axially through outlet 112 to engage valve 118. When the solenoid 68 is not energized, spring 120 is of sufficient strength to hold the valve 118 seated against seat 114 even though the valve actuator stem 128 rests on the valve. When the solenoid is energized, the valve actuator stem 128 moves downwardly, as seen in FIG. 2, forcing valve 118 to open outlet 112 and then engage valve seat 110 to close inlet 108. In this position the valve establishes fluid communication between the end of cylinder 82 adjacent shoulder 80 with sump chamber 70 through restrictive passage 116, valve chamber 106, and outlet 112. Valve actuator stem 128 is sufficiently smaller than outlet 112 to permit fluid flow therethrough without restriction relative to the restrictive action of passage 116.

Cylinder 82 has a modulator piston 130 reciprocably mounted therein for movement toward and away from shoulders 80 and 84. The piston has a piston head 132 facing shoulder 84 and a skirt section 134 extending toward shoulder 80. The edge 136 of skirt section 134 is normally positioned as shown in FIG. 2 when the modulator is inactive. An outlet 138, formed through a portion of cylinder wall 82 intermediate shoulders 80 and 84, connects cylinder 82 with sump chamber 70. Piston skirt edge 134 is positioned to leave outlet 138 open when the modulator is inactive. It can be seen that leftward movement of piston 130 will cause outlet 138 to be restricted against fluid flow and to be closed off upon sufficient piston movement. The modulator support chamber 140 is that portion of cylinder 82 between shoulder 80 and piston 130. It is this chamber to which passage 116 is always connected and to which outlet 138 is connected so long as the outlet is not closed by piston 130. A seal 142 mounted in a seal groove on the outer periphery of piston 130 effectively seals chamber 140 from the other chamber 144 defined by shoulder 84 and piston head 132. A vent port 146 is drilled through a portion of housing section 62 so as to open into chamber 144 through shoulder 84.

Another modulator piston 148 is sealingly and reciprocably mounted in cylinder 86. The piston end 150 extending toward piston 130 engages piston head 132 and is castellated or grooved to provide a passage 152 between piston end 150 and piston head 132. The other end 154 of piston 148 faces cylinder end 88 and is prevented from total surface engagement with the cylinder end by one or more small piston extensions 156. Seal 158, mounted in a sealed groove in the outer periphery of piston 148, seals the chambers on the opposite sides of piston 148 from fluid communication with each other. One such chamber 160 is positioned between the piston end 148 and the cylinder end 88. The other chamber 162 opens into chamber 144 and provides a continuation of that chamber.

Pistons 130 and 148 have axially aligned passages 164 and 166 extending therethrough, the passages respectively having seals 168 and 170 positioned in internal seal grooves. Passages 164 and 166 are also axially aligned with bore 64. The adjacent ends of passages 164 and 166 are enlarged to provide a return spring chamber 172 to which passage 152 is fluidly connected. A displacement valve actuator 174 is reciprocably and sealingly mounted in bore 64, extending axially through pistons 130 and 148. The left end of actuator 174 is formed as a piston 176 with a seal 178, the piston being reciprocably received in cylinder 74 and the piston end 180 being continuously exposed to fluid in actuating pressure inlet 78. The center portion 182 of actuator 174 sealingly and reciprocably extends through piston passage 164. It has a return spring 184 about it, the spring being in chamber 140 and having one end engaging piston 130. The other spring end engages a spring stop 186 on actuator 174 adjacent piston 176. In the position shown, actuator 174 has its left end 180 engaging the cylinder end 76 and providing reaction for spring 184 through stop 186. The spring therefore urges piston 130 rightwardly into engagement with piston 148, which in turn is positioned in the right end of cylinder 86 against cylinder end 88.

The actuator center portion 182 also extends through chamber 172 and passage 116 of piston 148. Seals 168 and 170 sealingly engage actuator 174 to prevent fluid leakage at these points. The right end 188 of actuator 174 extends into outlet 90 and is axially aligned with displacement valve 102, located in valve chamber 92. Valve 102 is urged toward valve seat 98 by a light valve spring 104. It can be seen that rightward movement of actuator 174 will cause valve 102 to be moved away from seat 98, and sufficient movement will cause the valve to seat against valve seat 100, closing inlet 94. When the valve is in this position, fluid communication is established between passage 96 and chamber 160 through outlet 90.

Another return spring 194 is positioned in chamber 172. One end of spring 194 engages piston 148 and the other end engages a spring stop 196 located on the center portion 182 of actuator 174. Thus spring 194 also urges piston 148 rightwardly toward cylinder end 88.

When the modulator is inactive, all of the elements are in the position shown in FIG. 2. Assuming the sensor 56 does not sense an incipient wheel locking condition, the logic control 54, connected to solenoid 68 through connector 200, does not energize solenoid 68. Assuming the pump 38 to be driven by the vehicle engine, power steering fluid is circulated through the power steering gear and the modulator and returned to the reservoir 50. When the power steering gear is not being operated, the fluid flow continues but at only a sufficient pressure to overcome line loss. Therefore, fluid enters inlet 78, passes through inlet 108 and valve chamber 106, enters chamber 140 through passage 116, and passes through outlet 138 to chamber 70. It is then returned to the reservoir 50 through outlet 72 and conduit 48. The rate of flow is such that the fluid is permitted relatively free flow through the modulator.

When the logic control 54 generates a signal to activate the modulator, solenoid 68 is energized. Armature 122 pivots downwardly due to magnetic attraction, engaging core 124 and moving valve 118 into engagement with seat 110 due to the movement of valve actuator stem 128 by the armature. This immediately restricts fluid flow through inlet 108, causing an immediate pressure build-up in inlet 78 acting on valve actuator piston end 180. The displacement valve actuator 174 is therefore moved to the right against the forces of springs 184 and 194, causing valve 102 to move into engagement with valve seat 100. This closes inlet 94, preventing any further brake supply pressure generated by master cylinder 18 from entering valve chamber 92. This also communicates the brake apply pressure at the rear brakes 30 and 32 with chamber 160 through passage 96, valve chamber 92 and outlet 90. The brake apply pressure acts against the end of piston 148 exposed to chamber 160, moving piston 148 leftwardly against the force of spring 194. This increases the volume of chamber 160, decreasing the brake apply pressure at rear brakes 30 and 32. Movement of piston 148 in this manner also moves piston 130 leftwardly against the force of spring 184, since the two pistons are engaged. This causes the piston skirt edge 134 to close outlet 138, forcing fluid otherwise trapped in chamber 140 to move through restrictive passage 116. The restriction of this passage therefore controls the rate of leftward movement of pistons 130 and 148. The fluid displaced from chamber 140 passes through valve chamber 106, outlet 112 and chamber 70 to the pump reservoir. If the pressure build-up in inlet 78 is sufficient, it will act against valve 118 to force actuator stem 128 upwardly against the action of solenoid 68, relieving the pressure and permitting some flow past the valve and to the sump chamber 70. Valve 118 therefore functions as a pressure relief valve to limit pressure build-up upstream of the modulator.

Upon deenergization of solenoid 68 by logic control 54, valve 118 moves to close outlet 112. Pressure in inlet 78 therefore passes through the valve chamber 106 and passage 116 to chamber 140. The chamber is therefore pressurized and piston 130 is moved rightwardly against the force exerted on it by piston 148. This forces piston 148 to move rightwardly, decreasing the volume in chamber 160 and therefore increasing the brake apply pressure to the rear brakes 30 and 32 even though valve 102 remains seated on valve seat 100. When piston 130 moves rightwardly sufficiently far to cause skirt edge 134 to open outlet 138, the pressure upstream of chamber 40 is decreased, including the pressure at inlet 78. When this pressure is no longer able to support the displacement valve actuator 174 against the forces of return springs 184 and 194, the actuator is moved leftwardly. This permits valve 102 to open inlet 94 and again seat on valve seat 98, closing outlet 90. The brake supply pressure from the master cylinder 18 is therefore again connected to provide brake apply pressure to the rear brakes 30 and 32. The brake apply pressure at these brakes then matches the master cylinder supply pressure.

If there is no power steering pump output pressure due to the pump being inoperative, the displacement valve actuator 174 will remain in the position shown in FIG. 2 even though the solenoid 68 is energized and inlet 108 is closed. Therefore the displacement valve 102 remains in the position shown, sealing the chamber 160 from the rear brake circuit and continuing to maintain the master cylinder pressure in fluid communication with the rear brakes.

What is claimed is:
1. A brake pressure modulator comprising:
   a first piston having modulator power fluid on one side thereof;
   first valve means in a first position permitting substantially free flow of power fluid past said first piston one side without power pressure build-up, and in a second position preventing power fluid flow past said first piston one side;
   second valve means in a first position permitting substantially free brake actuating pressure and fluid flow changes between the brake apply pressure portion and the brake supply pressure portion of a brake circuit, and in a second position preventing any pressure increase in the brake apply pressure portion by a pressure increase in the brake supply pressure portion of the brake circuit;
   a second piston responsive to movement of said second valve means to its second position to be acted on by brake apply pressure in the brake apply pressure portion of the brake circuit to be moved to increase the effective fluid volume of the brake apply pressure portion and therefore decrease brake apply pressure, such movement of said second piston also acting on said first piston to move said first piston against power fluid on its one side to move such power fluid to exhaust past said first valve means while said first valve means is in its second position, such power fluid movement to exhaust having means restricting same to establish a brake apply pressure release rate while said first and second valve means are in their second positions;
   a third piston responsive to power pressure build-up in modulator power fluid caused by movement of said first valve means to its second position to move said second valve means to its second position;
   control means for selectively moving said first valve means from its first position to its second position to actuate the modulator and to permit movement of said first valve means from its second position to its first position;
   said first piston upon return of said first valve means to its first position being then responsive to power pressure to move said second piston to decrease the effective fluid volume of the brake apply pressure portion of the brake circuit to increase the brake apply pressure therein, such first piston movement causing a decrease in power pressure acting on said third piston;
   and means acting upon a reduction of power pressure to a predetermined level to move said third piston to permit movement of said second valve means from its second position to its first position.

2. A brake pressure modulator for selectively limiting, reducing and reapplying brake actuating pressure in a brake circuit in accordance with a wheel lock control logic, said modulator comprising:
   a housing having a stepped bore therein defining three cylinders, the first cylinder being the smallest in diameter and opening into the second cylinder which is the largest in diameter, the third cylinder being connected with the second cylinder by a shoulder; said housing further having a first valve chamber provided with an inlet and an outlet each defining an annular valve seat, and a passage connecting with said second cylinder, a second valve chamber provided with an inlet and an outlet each defining an annular valve seat, and a passage adapted to be connected to a brake to be controlled, the second valve chamber inlet being adapted to be connected to a source of brake actuating pressure and the second valve chamber outlet being a part of said bore communicating with said third cylinder; said housing further having an actuating pressure inlet in continuous fluid communication with the end of said first cylinder opposite said second cylinder and also with said first valve chamber inlet, a second chamber outlet in the bore wall defining said second cylinder, a sump connecting chamber to which said first valve chamber outlet and said second chamber outlet are connected, and a vent port for said second chamber in the shoulder thereof;
   a displacement valve actuator in said bore and having a piston on one end sealingly and reciprocably received in said first chamber, a center portion extending through said second and third chambers, and the other end extending into said second valve chamber outlet in radially spaced relation thereto to permit fluid movement through said second valve chamber outlet;
   a first modulator piston reciprocably and sealingly received in said second chamber and about said displacement valve actuator, and a first return spring acting between said first modulator piston and said displacement valve actuator urging said first modulator piston toward said shoulder; said first modulator piston having a skirt section axially movable in a direction away from said shoulder to restrict and close said second chamber outlet;

a second modulator piston reciprocably and sealingly received in said third cylinder and about said displacement valve actuator, and a second return spring acting between said second modulator piston and said displacement valve actuator urging said second modulator piston toward said second valve chamber outlet and a second shoulder at the end of said third cylinder through which said second valve chamber outlet extends;

a first valve in said first valve chamber normally closing the outlet thereof and having solenoid actuated means for selectively moving said first valve to open said first valve chamber outlet and close said first valve chamber inlet;

a second valve in said second valve chamber normally closing the outlet thereof and movable by axial movement of said displacement valve actuator in one direction to open said second valve chamber outlet and close said second valve chamber inlet;

said modulator in the inactivated condition having actuating pressure fluid flow passing from said actuating pressure inlet to said sump connecting chamber through said first valve chamber inlet, chamber, and passage to said second cylinder and then through said second cylinder outlet, and brake actuating pressure fluid connected between said second valve chamber inlet and said second valve chamber passage through said second valve chamber;

said modulator upon activation during braking moving said first valve to close said first valve chamber inlet and fluidly connect said first valve chamber outlet and passage through said first valve chamber to release pressure in said second cylinder acting on said first modulator piston, the modulator actuating pressure at said actuating pressure inlet increasing and acting on said displacement valve actuator piston in said first cylinder to move said actuator to cause said second valve to open said valve chamber outlet and close said second valve chamber inlet, thereby preventing any further brake actuating pressure increase, the brake actuating pressure passing through said second valve chamber outlet and into said third cylinder to act on said second modulator piston to move the same to increase brake actuating circuit displacement and thereby decrease the brake apply pressure, movement of said second modulator piston moving said first modulator piston to further restrict and then close said second cylinder outlet.

* * * * *

UNITED STATES PATENT AND TRADEMARK OFFICE
CERTIFICATE OF CORRECTION

PATENT NO. : 3,999,810
DATED : December 28, 1976
INVENTOR(S) : Donald E. Schenk

It is certified that error appears in the above-identified patent and that said Letters Patent are hereby corrected as shown below:

Column 8, line 17, after "open said" insert second.

Signed and Sealed this

Twelfth Day of April 1977

[SEAL]

Attest:

RUTH C. MASON
*Attesting Officer*

C. MARSHALL DANN
*Commissioner of Patents and Trademarks*